US008655664B2

(12) United States Patent
Tachibana et al.

(10) Patent No.: US 8,655,664 B2

(45) Date of Patent: Feb. 18, 2014

(54) TEXT PRESENTATION APPARATUS, TEXT PRESENTATION METHOD, AND COMPUTER PROGRAM PRODUCT

(75) Inventors: Kentaro Tachibana, Kanagawa (JP); Gou Hirabayashi, Kanagawa (JP); Takehiko Kagoshima, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 167 days.

(21) Appl. No.: 13/207,575

(22) Filed: Aug. 11, 2011

(65) Prior Publication Data

US 2012/0065981 A1 Mar. 15, 2012

(30) Foreign Application Priority Data

Sep. 15, 2010 (JP) ................................ 2010-207100

(51) Int. Cl.

| | |
|---|---|
| ***G10L 13/00*** | (2006.01) |
| ***G10L 15/26*** | (2006.01) |
| ***G10L 15/00*** | (2013.01) |
| ***G10L 15/06*** | (2013.01) |
| ***G10L 15/16*** | (2006.01) |
| ***G06F 17/20*** | (2006.01) |
| ***G06F 17/27*** | (2006.01) |
| ***G06F 17/21*** | (2006.01) |
| ***G10L 13/08*** | (2013.01) |
| ***G10L 21/00*** | (2013.01) |
| ***G10L 25/00*** | (2013.01) |

(52) U.S. Cl.

USPC ........... 704/270; 704/260; 704/235; 704/244; 704/232; 704/8; 704/2; 704/9; 704/10; 704/266

(58) Field of Classification Search

USPC .......... 704/230–275; 715/229, 210, 260, 251, 715/764, 745, 723, 751, 753

See application file for complete search history.

(56) References Cited

U.S. PATENT DOCUMENTS

| | | | | |
|---|---|---|---|---|
| 6,751,592 | B1 * | 6/2004 | Shiga | 704/258 |
| 6,823,309 | B1 * | 11/2004 | Kato et al. | 704/267 |

(Continued)

FOREIGN PATENT DOCUMENTS

| | | |
|---|---|---|
| JP | 60-170885 | 9/1985 |
| JP | 63-161498 | 7/1988 |

(Continued)

OTHER PUBLICATIONS

Japanese Office Action for Japanese Application No. 2010-207100 mailed on Sep. 4, 2012.

*Primary Examiner* — Paras D Shah

*Assistant Examiner* — Anne Thomas-Homescu

(74) *Attorney, Agent, or Firm* — Turocy & Watson, LLP

(57) ABSTRACT

According to an embodiment, a text presentation apparatus presenting text for a speaker to read aloud for voice recording includes: a text storing unit for storing first text; a presenting unit for presenting the first text; a determination unit for determining whether or not the first text needs to be replaced, on the basis of a speaker's input for the first text presented; a preliminary text storing unit for storing preliminary text; a select unit configured to select, if it is determined that the first text needs to be replaced, second text to replace the first text from among the preliminary text, the selecting being performed on the basis of attribute information describing an attribute of the first text and on the basis of at least one of attribute information describing pronunciation of the first text and attribute information describing a stress type of the first text; and a control unit configured to control the presenting unit so that the presenting unit presents the second text.

11 Claims, 7 Drawing Sheets

(56) References Cited

U.S. PATENT DOCUMENTS

| | | | | |
|---|---|---|---|---|
| 7,280,963 | B1 * | 10/2007 | Beaufays et al. | 704/236 |
| 7,315,818 | B2 * | 1/2008 | Stevens et al. | 704/235 |
| 8,015,011 | B2 * | 9/2011 | Nagano et al. | 704/260 |
| 8,249,873 | B2 * | 8/2012 | Blair et al. | 704/252 |
| 2002/0123894 | A1 * | 9/2002 | Woodward | 704/260 |
| 2007/0088547 | A1 * | 4/2007 | Freedman | 704/235 |
| 2008/0243474 | A1 * | 10/2008 | Furihata et al. | 704/2 |
| 2008/0256071 | A1 * | 10/2008 | Prasad et al. | 707/6 |
| 2009/0292538 | A1 * | 11/2009 | Barnish | 704/232 |
| 2010/0004931 | A1 * | 1/2010 | Ma et al. | 704/244 |
| 2010/0057457 | A1 * | 3/2010 | Ogata et al. | 704/235 |
| 2010/0100385 | A1 * | 4/2010 | Davis et al. | 704/260 |
| 2010/0125459 | A1 * | 5/2010 | Itoh et al. | 704/260 |
| 2010/0153115 | A1 * | 6/2010 | Klee et al. | 704/260 |
| 2010/0312565 | A1 * | 12/2010 | Wang et al. | 704/260 |
| 2011/0131038 | A1 * | 6/2011 | Oyaizu et al. | 704/10 |
| 2011/0202876 | A1 * | 8/2011 | Badger et al. | 715/816 |

FOREIGN PATENT DOCUMENTS

| | | |
|---|---|---|
| JP | 02-238494 | 9/1990 |
| JP | 03-217900 | 9/1991 |
| JP | 2003-186489 | 7/2003 |

* cited by examiner

| ATTRIBUTE INFORMATION | DEGREE OF IMPORTANCE |
|---|---|
| TYPE OF LOW-FREQUENCY PHONEME INCLUDED IN TEXT | 3 |
| TYPES OF PHONEMES BEFORE AND AFTER LOW-FREQUENCY PHONEME | 2 |
| POSITION OF STRESSED KEY PHRASE IN BREATH GROUP | 1 |
| STRESS TYPE OF STRESSED KEY PHRASE | 3 |
| NUMBER OF STRESSED PHRASES THAT CONSTITUTE TEXT | 1 |
| RISING INTONATION IS INCLUDED | 4 |

FIG.6

(cafe)
1. KAFFE 6010
ATTRIBUTE INFORMATION:
STRESS TYPE OF STRESSED KEY PHRASE: 6014
3 MORA I TYPE, "KAFFE" 6012
TYPE OF LOW-FREQUENCY PHONEME INCLUDED: "FE"
NUMBER OF STRESSED PHRASES THAT CONSTITUTE TEXT: 1
SUM OF DEGREES OF IMPORTANCE OF MATCHING ATTRIBUTE INFORMATION: 7

(Fedoseyev)
2. FEDOSĒEFU 6020
ATTRIBUTE INFORMATION:
STRESS TYPE OF STRESSED KEY PHRASE: 6024
6 MORA III TYPE, "FEDOSĒEFU" 6022
TYPE OF LOW-FREQUENCY PHONEME INCLUDED: "FE"
NUMBER OF STRESSED PHRASES THAT CONSTITUTE TEXT: 1
SUM OF DEGREES OF IMPORTANCE OF MATCHING ATTRIBUTE INFORMATION: 4

(festival)
3. FESUTHIBARU 6030
ATTRIBUTE INFORMATION:
STRESS TYPE OF STRESSED KEY PHRASE: 6034
5 MORA I TYPE, "FESUTHIBARU" 6032
TYPE OF LOW-FREQUENCY PHONEME INCLUDED: "FE"
NUMBER OF STRESSED PHRASES THAT CONSTITUTE TEXT: 1
SUM OF DEGREES OF IMPORTANCE OF MATCHING ATTRIBUTE INFORMATION: 4

FIG.7

(How did you like Today's chocolate?) 7000

KYOU NO CHOKORĒTO WA DOUDATTA?

FIG.8

8010

(How did you like Today's chocolate?)
PRESENTED TEXT: KYOU NO CHOKORĒTO WA DOUDATTA?
ATTRIBUTE INFORMATION:
[MANDATORY ATTRIBUTE INFORMATION] RISING INTONATION IS INCLUDED
STRESS TYPE OF STRESSED KEY PHRASE:
6 MORA III TYPE, "CHOKORĒTO WA" ~8020
NUMBER OF STRESSED PHRASES THAT CONSTITUTE TEXT: 3

FIG.9

(Is a blue strap attached to it?)
1. AO NO SUTORAPPU WA TSUITERUNO? ~9010
ATTRIBUTE INFORMATION:
[MANDATORY ATTRIBUTE INFORMATION] RISING INTONATION IS INCLUDED
STRESS TYPE OF STRESSED KEY PHRASE: 6 MORA III TYPE, "SUTORAPPU WA" ~9012
NUMBER OF STRESSED PHRASES THAT CONSTITUTE TEXT: 3
SUM OF DEGREES OF IMPORTANCE OF MATCHING ATTRIBUTE INFORMATION: 8

(Do you play skeleton, a favarite winter sport?) 9020
2. FUYU NO NINKI SUPŌTSU NO SUKERUTON WA YATTERUNO?
ATTRIBUTE INFORMATION:
[MANDATORY ATTRIBUTE INFORMATION] RISING INTONATION IS INCLUDED
STRESS TYPE OF STRESSED KEY PHRASE: 6 MORA III TYPE, "SUKERUTON WA" ~9022
NUMBER OF STRESSED PHRASES THAT CONSTITUTE TEXT: 4
SUM OF DEGREES OF IMPORTANCE OF MATCHING ATTRIBUTE INFORMATION: 7

(How was my mother's...?)
3. HAHA NO CHĪZUFONDHU WA OISHII? ~9030
ATTRIBUTE INFORMATION:
[MANDATORY ATTRIBUTE INFORMATION] RISING INTONATION IS INCLUDED
STRESS TYPE OF STRESSED KEY PHRASE: 6 MORA IV TYPE, "CHĪZUFONDHU WA" ~9032
LOW-FREQUENCY PHONEME: "FO" ~9034
POSITION OF STRESSED KEY PHRASE IN BREATH GROUP: Front
NUMBER OF STRESSED PHRASES THAT CONSTITUTE TEXT: 3
SUM OF DEGREES OF IMPORTANCE OF MATCHING ATTRIBUTE INFORMATION: 5

FIG.10

(The life planner-oriented...)

10000

RAIFU PURAN'NĀ WO CHŪSHIN TO SHITA EIGYOU NO JISSEKI WA, ZENBEI TOPPU NO HOKEN GURŪPU DEARU OYAGAISHA DE JISSHOUZUMI DA.

FIG.11

(Terry won't miss...)

TEXT:

11010

RAIFU PURAN'NĀ WO CHŪSHIN TO SHITA EIGYOU NO JISSEKI WA, ZENBEI TOPPU NO HOKEN GURŪPU DEARU OYAGAISHA DE JISSHOUZUMI DA.

ATTRIBUTE INFORMATION:
[MANDATORY ATTRIBUTE INFORMATION] STRESS TYPE OF STRESSED KEY PHRASE:
10 MORA V TYPE, "HOKEN GURŪPU DE ARU" ~11012
NUMBER OF STRESSED PHRASES THAT CONSTITUTE TEXT: 8

TEXT PRESENTATION APPARATUS, TEXT PRESENTATION METHOD, AND COMPUTER PROGRAM PRODUCT

CROSS-REFERENCE TO RELATED APPLICATION(S)

This application is based upon and claims the benefit of priority from Japanese Patent Application No. 2010-207100, filed on Sep. 15, 2010; the entire contents of which are incorporated herein by reference.

FIELD

Embodiments described herein relate generally to a text presentation apparatus, a text presentation method, and a computer program product.

BACKGROUND

Conventionally, text speech synthesis technologies for artificially created human speech from arbitrary text have been known. In the text speech synthesis technologies, voices corresponding to words or phonemes that constitute character text are synthesized to create speech (referred to as synthesized speech) corresponding to the text. To create synthesized speech of a person, it is necessary to prepare a script (referred to as recording script) that includes predetermined text, to record the voice of the person who reads the text of the recording script aloud, and to collect sounds corresponding to the respective words or phonemes to create a synthesis dictionary. Scripts for recording that are commonly used in creating a synthesis dictionary include text that is composed in consideration of the selection of phonemes and intonations. Such recording scripts often contain words that are unfamiliar to the speaker and passages that the speaker finds it difficult to pronounce. JP-A 2003-186489 (KOKAI) disclose a recording script creating apparatus for creating such a recording script, and a recording management apparatus for managing recording based on the script.

According to JP-A 2003-186489 (KOKAI), when the speaker finds it difficult to pronounce a certain piece of text in the recording script and the voice recorded for the text is rejected by the recording management apparatus, the voice for the text needs to be recorded again. This can lead to repeated retakes with an increase in recording cost and a deterioration in the quality of the voice recorded. What text is considered to be difficult to pronounce much varies from person to person, and it is difficult to prepare a script tailored to the speaker in advance. Under the circumstances, it has been difficult to collect high-quality voices, difficult to collect voices in consideration of the selection of phonemes and intonations as desired by a person who makes the recording script, and difficult to make a high-quality synthesis dictionary.

BRIEF DESCRIPTION OF THE DRAWINGS

FIG. 6 is a diagram showing examples of the candidate pieces of text to be a substitute and their attribute information;

FIG. 7 is a diagram showing an example of the text presented according to a second embodiment;

FIG. 8 is a diagram showing an example of text and attribute information that are stored in the text storing unit;

FIG. 9 is a diagram showing examples of candidate pieces of text to be a substitute and their attribute information;

FIG. 10 is a diagram showing an example of text presented;

FIG. 11 is a diagram showing an example of the text and attribute information that are stored in the text storing unit;

DETAILED DESCRIPTION

According to an embodiment, a text presentation apparatus presenting text for a speaker to read aloud for voice recording, includes: a text storing unit configured to store first text; a presenting unit configured to present the first text; a determination unit configured to determine whether or not the first text needs to be replaced, on the basis of a speaker's input for the first text presented; a preliminary text storing unit configured to store preliminary text; a select unit configured to select, if it is determined that the first text needs to be replaced, second text to replace the first text from among the preliminary text, the selecting being performed on the basis of attribute information describing an attribute of the first text and on the basis of at least one of attribute information describing pronunciation of the first text and attribute information describing a stress type of the first text; and a control unit configured to control the presenting unit so that the presenting unit presents the second text.

First Embodiment

A first embodiment of the text presentation apparatus, a text presentation method, and a program for presenting text to be read aloud by a speaker for voice recording will be described. Initially, a description will be given of the hardware configuration of the text presentation apparatus. The text presentation apparatus according to the present embodiment includes a control unit such as a CPU (Central Processing Unit) that controls the entire apparatus, a main storage unit such as a ROM (Read Only Memory) and a RAM (Random Access Memory) that stores various types of data and various programs, an auxiliary storage unit such as a HDD (Hard Disk Drive) and a CD (Compact Disk) drive that contains various types of data and various programs, and a bus that connects these components. Such a hardware configuration is constructed by using an ordinary computer. A display unit that displays information, an operation input unit such as a keyboard and a mouse that inputs user operations, and a voice input unit that inputs speaker's voice are connected to the text presentation apparatus by wired or wireless means. In the present embodiment, the speaker's voice input through the voice input unit is recorded by a recording apparatus (not shown) according to an operation input through the operation input unit.

Figure 1:
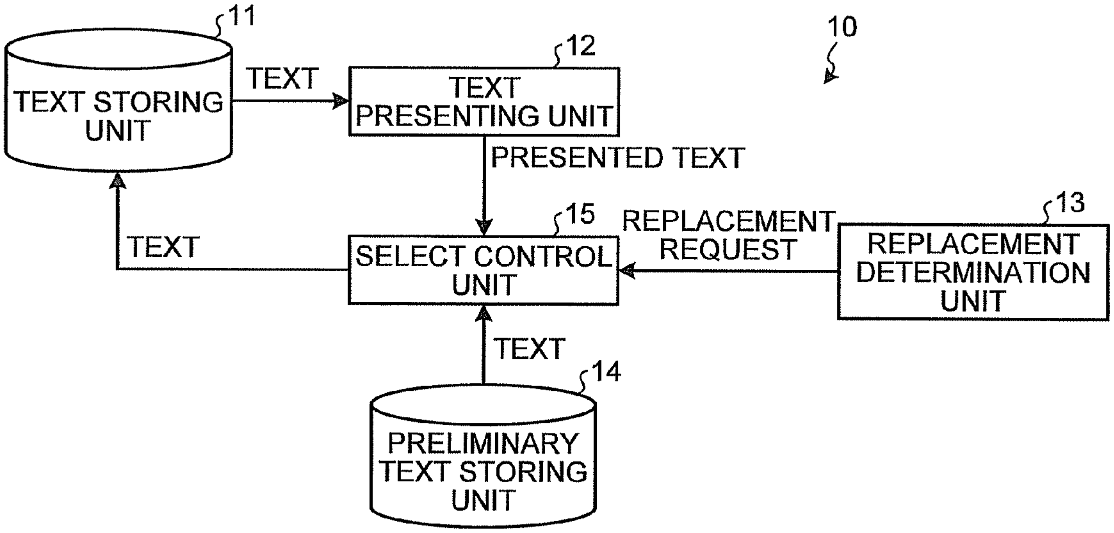
FIG. 1 is a diagram showing an example of the functional configuration of a text presentation apparatus according to a first embodiment.

With such a hardware configuration, the functional configuration of the text presentation apparatus will now be described with reference to FIG. 1. A text presentation apparatus 10 includes a text storing unit 11, a text presenting unit 12, a replacement determination unit 13, a preliminary text storing unit 14, and a select control unit 15. The text presenting unit 12 and the replacement determination unit 13 are implemented by the CPU of the text presentation apparatus 10 executing various programs stored in the main and auxiliary storage units. The text storing unit 11 and the preliminary text storing unit 14 are implemented in the auxiliary storage unit such as a HDD.

Figure 2:
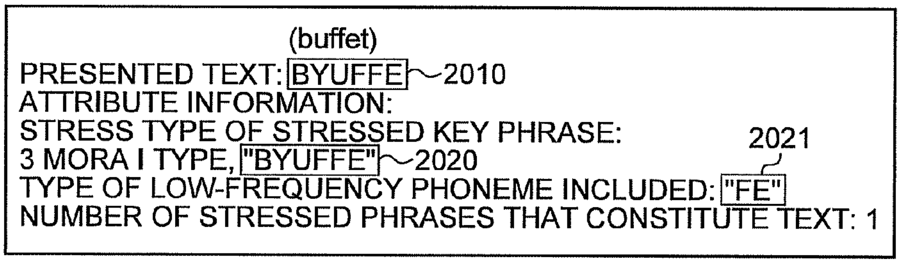
FIG. 2 is a diagram showing an example of text and attribute information that are stored in a text storing unit.

The text storing unit 11 stores text to be read aloud by the speaker for voice recording in association with attribute information that describes the attributes of the text. FIG. 2 is a diagram showing an example of the text that is stored in the text storing unit 11 in association with attribute information. The example in the diagram shows that text “byuffe” 2010 (indicated by the reference numeral 2010 (in English, it means buffet)) shown in FIG. 2 is associated with pieces of attribute information including its pronunciation, “stress type of a stressed key phrase”, “type of a low-frequency phoneme included in the text”, and “the number of stressed phrases that constitute the text”. The attribute values of the respective pieces of attribute information are as follows: The attribute value of “stress type of a stressed key phrase” is “3 mora I type”. The attribute value of “type of a low-frequency phoneme included in the text” is “fe” 2021 (in English, it means a pronunciation of fe). The attribute value of “the number of stressed phrases that constitute the text” is “1”. The attribute information may include other information such as the phoneme type of the low-frequency phoneme, the position of the stressed key phrase in the breath group, and the presence of a rising intonation.

The preliminary text storing unit 14 stores a plurality of pieces of text, in association with attribute information, that can replace the text stored in the text storing unit 11. The attribute information that is stored in the preliminary text storing unit 14 in association with the text is the same as that stored in the text storing unit 11.

Figure 3:
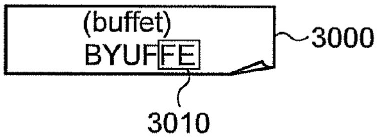
FIG. 3 is a diagram showing an example of text presented.

The text presenting unit 12 presents the text stored in the text storing unit 11. Specifically, for example, the text presenting unit 12 displays the text on the display unit. For example, the text of the example shown in FIG. 2 is presented as shown in FIG. 3.

The replacement determination unit 13 determines whether or not the text presented by the text presenting unit 12 needs to be replaced, on the basis of a speaker’s input for the text. Examples of the speaker’s input include an operation (operation input) that is input by the speaker through the operation input unit, and the speaker’s voice that is input through the voice input unit. Based on such an input, the determination is made, for example, as follows. The replacement determination unit 13 determines that the text needs to be replaced if an operation input that gives an instruction to replace the text is accepted through the operation input unit, or if a voice that gives an instruction to replace the text is input into the voice input unit. Such inputs are made when the speaker finds it difficult to pronounce.

Figures 4, 5:
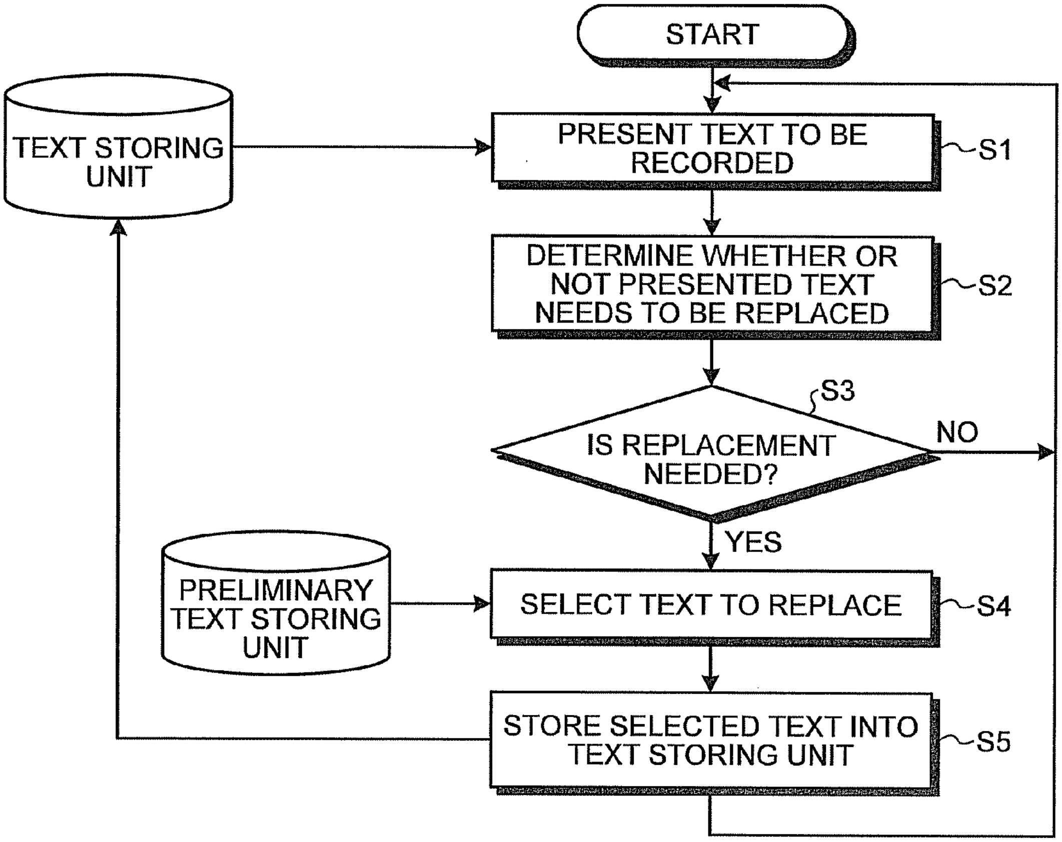
FIG. 4 is a diagram showing an example of the correspondence between pieces of attribute information and degrees of importance.
FIG. 5 is a flowchart showing the procedure of text presentation and replacement processing to be performed by the text presentation apparatus.

The select control unit 15 selects a piece of text to replace the text that the replacement determination unit 13 determines needs to be replaced (referred to as text to be replaced) from the preliminary text storing unit 14 on the basis of the attribute information on the text to be replaced. Specifically, using, the attribute information associated with the text to be replaced, the attribute information associated with the pieces of text stored in the preliminary text storing unit 14, and the degrees of importance associated with the respective pieces of attribute information, the select control unit 15 calculates the sum of the degrees of importance for each piece of text, and selects a piece of text that maximizes the sum of the degrees of importance as a substitute from the preliminary text storing unit 14. FIG. 4 shows an example of the correspondence between the pieces of attribute information and the degrees of importance, which is stored in the auxiliary storage unit such as a HDD. The select control unit 15 stores the selected text into the text storing unit 11 in association with the attribute information, thereby making the text presenting unit 12 present the text.

Next, the procedure of text presentation and replacement processing to be performed by the text presentation apparatus 10 according to the present embodiment will be described with reference to FIG. 5. Using the function of the text presenting unit 12, the text presentation apparatus 10 presents a piece of text that is yet to be presented among pieces of text stored in the text storing unit 11 (step S1). Next, using the function of the replacement determination unit 13, the text presentation apparatus 10 determines whether or not the text presented in step S1 needs to be replaced, on the basis of a speaker’s input (step S2). If the replacement is determined to be not needed (step S3: NO), the processing returns to step S1 and the text presentation apparatus 10 presents a piece of text that is yet to be presented among the pieces of text stored in the text storing unit 11. Suppose, on the other hand, that the replacement is determined to be needed (step S3: YES). Using the function of the select control unit 15, the text presentation apparatus 10 then selects a piece of text to replace the text that is determined needs to be replaced (text to be replaced) from the preliminary text storing unit 14 on the basis of the attribute information on the text to be replaced (step S4). Specifically, referring to the attribute information associated with the text to be replaced in the text storing unit 11, the attribute information associated with the pieces of text stored in the preliminary text storing unit 14, and the degrees of importance associated with the respective pieces of attribute information, the text presentation apparatus 10 calculates the sum of the degrees of importance of pieces of attribute information that have matching attribute values for each piece of text. The text presentation apparatus 10 selects a piece of text that maximizes the sum of the degrees of importance from the preliminary text storing unit 14.

Suppose, for example, that the text presentation apparatus 10 determines that text replacement is needed when the text “byuffe” 3000 shown in FIG. 3 is presented. As shown in FIG. 2, the text (text to be replaced) is associated with attribute information “stress type of a stressed key phrase”, “type of a low-frequency phoneme included in the text”, and “the number of stressed phrases that constitute the text”. The pieces of attribute information have attribute values “3 mora I type”, “fe” 2010, and “1”, respectively. For each piece of text stored in the preliminary text storing unit 14, the text presentation apparatus 10 determines whether the pieces of attribute information associated with that piece of text have respective matching attribute values. The text presentation apparatus 10 adds the degrees of importance associated with the pieces of attribute information that have matching attribute values as the sum of the degrees of importance of that piece of text.

FIG. 6 is a diagram showing examples of the pieces of text, along with their attribute information, that rank in top three in terms of the sum of the degrees of importance among the pieces of text stored in the preliminary text storing unit 14 with respect to the text to be replaced shown in FIG. 2. In the diagram, “kaffe” 6010, 6012 (in English, it means café) has attribute information “stress type of a stressed key phrase”, “type of a low-frequency phoneme included in the text”, and “the number of stressed phrases that constitute the text” with respective attribute values “3 mora I type”, “fe” 6014, and “1”. The attribute values match those of the text to be replaced. As shown in FIG. 4, the pieces of attribute information with the matching attribute values are associated with degrees of importance “3”, “3”, and “1”, respectively. The sum of the degrees of importance for the text “kaffe” 6010 is “3+3+1=7”.

For “fedosēefu” 6020 (in English, it means Fedoseyev) in FIG. 6, the pieces of attribute information “stress type of a stressed key phrase”, “type of a low-frequency phoneme included in the text”, and “the number of stressed phrases that constitute the text” have attribute values “6 mora III type”, “fe” 6024, and “1”, respectively. Among the pieces of attribute information, “type of a low-frequency phoneme included in the text” and “the number of stressed phrases that constitute the text” have attribute values that match those of the text to be replaced. As shown in FIG. 4, the pieces of attribute information with the matching attribute values are associated with degrees of importance “3” and “1”, respectively. The sum of the degrees of importance for the text “fedosēefu” 6020 is “3+1=4”. Similarly, for “fesuthibaru” 6030 (in English, it means festival) in FIG. 6, the pieces of attribute information “stress type of a stressed key phrase”, “type of a low-frequency phoneme included in the text”, and “the number of stressed phrases that constitute the text” have attribute values “5 mora I type”, “fe”, and “1”. Among the pieces of attribute information, “type of a low-frequency phoneme included in the text” and “the number of stressed phrases that constitute the text” have attribute values that match those of the text to be replaced. As shown in FIG. 4, the pieces of attribute information with the matching attribute values are associated with degrees of importance “3” and “1”, respectively. The sum of the degrees of importance for the text “fesuthibaru” 6030 is “3+1=4”.

Among the three pieces of text, the maximum sum of the degrees of importance results from the text “kaffe” 6010. The text presentation apparatus 10 thus selects that text as a substitute. The text presentation apparatus 10 then stores the text selected in step S4 into the text storing unit 11 in association with its attribute information (step S5). For example, the text presentation apparatus 10 inserts the text selected in step S4 into the next position to be presented after the text to be replaced in the text storing unit 11. Note that the position to insert the text selected in step S4 into is not limited thereto, and may be the end position or any arbitrary position. The processing then returns to step S1 and the text presentation apparatus 10 presents a piece of text that is yet to be presented among the pieces of text stored in the text storing unit 11. Consequently, the text selected as a substitute is presented and the processing of step S2 and subsequent steps is performed.

As has been described above, when the speaker finds it difficult to pronounce a piece of text, another piece of text having an attribute value or values matching those of the text is selected and presented instead on the basis of the degrees of importance of the attribute information with those attribute values. This eliminates the need for the speaker to pronounce the text that he/she finds it difficult to pronounce, and can thus reduce the speaker’s burden of repeating retaking the text that the speaker finds it difficult to pronounce. It is also possible to collect voices in consideration of the selection of desired phonemes and intonations independent of speakers’ individual variations.

Since the piece of text to replace the text to be replaced is stored into the text storing unit 11, the text stored in the text storing unit 11 can be checked to see what text is adopted by the speaker as the reading text for recording.

Second Embodiment

Next, a second embodiment of the text presentation apparatus, text presentation method, and program will be described. Parts identical to those of the foregoing first embodiment will be designated by the same reference numerals, and a description thereof will be omitted.

In the present embodiment, the attribute information to be associated with the text stored in the text storing unit 11 and the preliminary text storing unit 14 further includes mandatory attribute information. The mandatory attribute information refers to a piece or pieces of attribute information for which a substitute absolutely needs to have a matching attribute value. Arbitrary other attribute information can also be associated with each piece of text. In the present embodiment, at least “stress type of a stressed key phrase” shall be associated.

The select control unit 15 selects a piece of text such as described below from the preliminary text storing unit 14 as a substitute for the text that the replacement determination unit 13 determines needs to be replaced (text to be replaced). That is, the select control unit 15 selects a piece of text that has a matching attribute value for attribute information designated as mandatory attribute information on the text to be replaced, and maximizes the sum of the degrees of importance of pieces of attribute information that have matching attribute values. If there are a plurality of pieces of text that maximize the sum of the degrees of importance, the select control unit 15 selects one that is associated with an attribute value closest to that of the attribute information “stress type of a stressed key phrased” that is associated with the text to be replaced. The reason is to maintain the intonation information on the text to be replaced.

Next, the procedure of the text presentation and replacement processing to be performed by the text presentation apparatus 10 according to the present embodiment will be described. Since the procedure itself of the text presentation and replacement processing according to the present embodiment is the same as that shown in FIG. 5, a description thereof will be omitted. According to the present embodiment, in step S4, the text presentation apparatus 10 refers to the attribute information associated with the text that is determined needs to be replaced in step S3, the attribute information associated with the pieces of text stored in the preliminary text storing unit 14, and the degrees of importance associated with the respective pieces of attribute information. The text presentation apparatus 10 calculates the sum of the degrees of importance of pieces of attribute information having matching attribute values for each piece of text in which the attribute information designated as the mandatory attribute information has a matching attribute value. The text presentation apparatus 10 selects a piece of text that maximizes the sum of the degrees of importance.

Suppose, for example, that the text presentation apparatus 10 determines that text replacement is needed when the text “kyou no chokorēto wa doudatta?” 7000 (in English, it means that “How did you like Today’s chocolate?”) shown in FIG. 7 is presented. As shown in FIG. 8, the text (text to be replaced) is associated with mandatory attribute information that has the attribute value indicating that a rising intonation is included. Attribute information "stress type of a stressed key phrase" and "the number of stressed phrases that constitute the text" is also associated. Focusing on pieces of text that are stored in the preliminary text storing unit 14 in association with the attribute information having the attribute value that a rising intonation is included, the text presentation apparatus 10 performs the following operation. That is, the text presentation apparatus 10 determines whether or not the attribute values of the other pieces of attribute information "stress type of a stressed key phrase", "type of a low-frequency phoneme included in the text", and "the number of stressed phrases that constitute the text" on the text to be replaced, "6 mora III type", "chokorēto wa" 8020, and "3", match those of the attribute information on each target piece of text. The text presentation apparatus 10 adds the degrees of importance associated with pieces of attribute information that have matching attribute values.

FIG. 9 is a diagram showing examples of the pieces of text, along with their attribute information, that are associated with the mandatory attribute information, or attribute information having the attribute value indicating that a rising intonation is included, and rank in top three in terms of the sum of the degrees of importance among the pieces of text stored in the preliminary text storing unit 14 with respect to the text to be replaced shown in FIG. 8. The text "ao no sutorappu wa tsuiteruno?" 9010 (in English it means that "Is a blue strap attached to it?") in FIG. 9 is associated with the attribute information having the attribute value indicating that a rising intonation is included. The text is also associated with the pieces of attribute information "stress type of a stressed key phrase" and "the number of stressed phrases that constitute the text" whose attribute values match those of the text to be replaced. As shown in FIG. 4, the pieces of attribute information with the matching attribute values are associated with degrees of importance "4", "3", and "1", respectively. The sum of the degrees of importance for the text "ao no sutorappu . . . " 9010 is "4+3+1=8".

The text "fuyu no ninki supōtsu . . . " 9020 (in English, it means that "Do they play . . . ) in the same diagram is associated with the attribute information having the attribute value indicating that a rising intonation is included. The text is also associated with the attribute information "stress type of a stressed key phrase" whose attribute value matches that of the text to be replaced. The resulting sum of the degrees of importance for the text "fuyu no ninki supōtsu" 9020 (in English, it means "do you play Skeleton, a favorite inter sport?) is "7". The text "haha no chīzufondhu" 9030 (in English, it means How was my mother's . . . ) in FIG. 9 is associated with the attribute information having the attribute value indicating that a rising intonation is included. The text is also associated with the attribute information "the number of stressed phrases that constitute the text" whose attribute value matches that of the text to be replaced. The resulting sum of the degrees of importance for the text "haha no chīzufondhu" 9030 is "5".

Among the three pieces of text, the maximum sum of the degrees of importance results from the text "ao no sutorappu" 9010. In step S4 of FIG. 5, the text presentation apparatus 10 therefore selects that text as a substitute.

Suppose, as another example, that the text presentation apparatus 10 determines that text replacement is needed when the text "raifu puran'nā wo chūshin to shita" 10000 (in English, it means that the life planner-oriented . . . ) shown in FIG. 10 is presented. As shown in FIG. 11, the text (text to be replaced) is associated with mandatory attribute information "stress type of a stressed key phrase" whose value is "10 mora V type". The text to be replaced is also associated with attribute information "the number of stressed phrases that constitute the text". Focusing on pieces of text that are stored in the preliminary text storing unit 14 in association with the attribute information "stress type of a stressed key phrase" with the attribute value "10 mora V type", the text presentation apparatus 10 performs the following operation. That is, the text presentation apparatus 10 determines whether or not the attribute value of the other piece of attribute information "the number of stressed phrases that constitute the text" on the text to be replaced, "8", matches that of the attribute information on each target piece of text. The text presentation apparatus 10 adds the degrees of importance associated with pieces of attribute information that have matching attribute values to determine the sum of the degrees of importance of the text.

Figure 12:
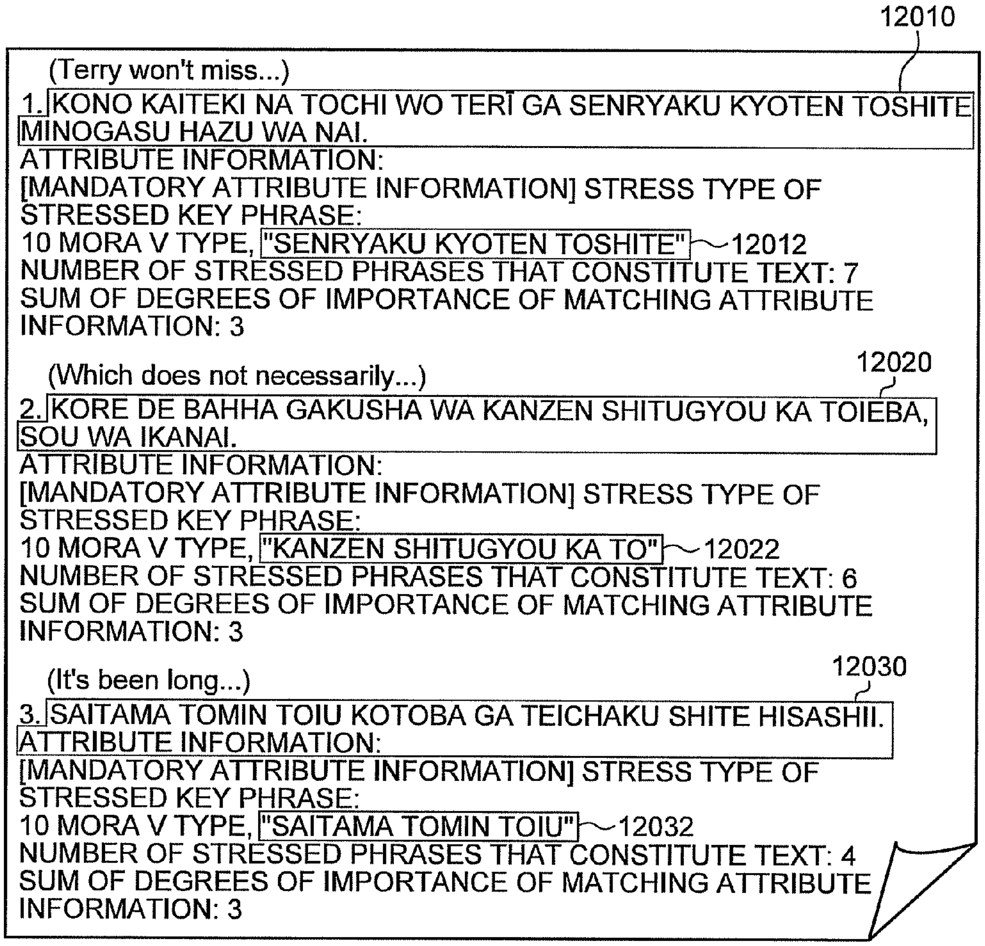
FIG. 12 is a diagram showing examples of the candidate pieces of text to be a substitute and their attribute information.

FIG. 12 is a diagram showing an example of the pieces of text, along with their attribute information, that are associated with the mandatory attribute information "stress type of a stressed key phrase" with the attribute value "10 mora V type" and rank in top three in terms of the sum of the degrees of importance among the pieces of text stored in the preliminary text storing unit 14 with respect to the text to be replaced shown in FIG. 11. The text "kono kaiteki na tochi wo" 12010 (in English, it means that "Terry won't miss . . . ") is associated with the attribute information "stress type of a stressed key phrase" whose attribute value is "10 mora V type". There is no other attribute value that matches that of the text to be replaced. As shown in FIG. 4, the attribute information having the matching attribute value is associated with a degree of importance "3". The sum of the degrees of importance for the text "kono kaiteki na tochi wo" 12010 is thus "3". The pieces of text "korede bahha" 12020 (in English, it means that "Which does not necessarily . . . ") and "saitama tomin" 12030 (in English, it means that "It's been long . . . ") in FIG. 12 are associated with the mandatory attribute information "stress type of a stressed key phrase" whose attribute value is "10 mora V type". There is no other attribute value that matches that of the text to be replaced. The resulting sums of the degrees of importance for the text "korede bahha . . . " 12020 and "saitama tomin . . . " 12030 are "3" each.

In such a case, the same maximum sum of the degrees of importance results from the three pieces of text "kono kaiteki na tochi wo . . . " 12010, "korede bahha . . . " 12020, and "saitama tomin . . . " 12030. Of the pieces of text that provide the maximum sum of the degrees of importance, the text presentation apparatus 10 selects one whose attribute information "the number of stressed phrases that constitute the text" has a value closest to that of the text to be replaced. In step S4 of FIG. 5, the text presentation apparatus 10 thus selects the text "kono kaiteki na tochi wo . . . " 12010 shown in FIG. 12 as a substitute.

In any case, step S5 subsequent to step S4 is the same as in the foregoing first embodiment.

According to the foregoing second embodiment, it is also possible to reduce the speaker's burden of repeating retaking the text that the speaker finds it difficult to pronounce. In addition, it is possible to collect voices in consideration of the selection of desired phonemes and intonations independent of speakers' individual variations. Since mandatory attribute information is used to select and present a piece of text to replace the text to be replaced, it is possible to record voices without missing essential elements.

Modification

It should be noted that the present invention is not limited to the foregoing embodiments themselves, and various modifications may be made to the components in the implementation phase without departing from the gist thereof. A plurality of components disclosed in the foregoing embodiments may be appropriately combined to form various inventions. For example, several components may be deleted from all those shown in the embodiments. Components of the different embodiments may be combined as appropriate. Various modifications such as described below may be made.

In the foregoing embodiments, the various programs to be executed by the text presentation apparatus 10 may be stored in a computer that is connected to a network such as the Internet, and may be provided by downloading through the network. The various programs may be recorded on a computer-readable recording medium such as a CD-ROM, flexible disk (FD), CD-R, and DVD (Digital Versatile Disk) in the form of installable or executable files, and may be provided as a computer program product.

The foregoing embodiments have dealt with the cases where the text stored in the text storing unit 11 and the text stored in the preliminary text storing unit 14 are associated with their attribute information in advance. However, the present invention is not limited thereto. For example, the text that the replacement determination unit 13 determines needs to be replaced may be linguistically analyzed by the select control unit 15 to acquire attribute information on the text. Similarly, the text stored in the preliminary text storing unit 14 may be linguistically analyzed by the select control unit 15 to acquire attribute information on the text.

In the foregoing embodiments, the attribute information is not limited to the above-mentioned examples. The attribute information needs only include at least either one of the pronunciation and stress type of the text.

In the foregoing embodiments, the degrees of importance associated with the attribute information are not limited to the above-mentioned examples.

In the foregoing embodiments, the preliminary text storing unit 14 may contain a predetermined plurality of pieces of text to be substitutes for the text stored in the text storing unit 11 on the basis of the attribute information on the text. In such a case, the text presentation apparatus 10 may store the correspondence between the text stored in the text storing unit 11 and the predetermined pieces of text that are stored in the preliminary text storing unit 14 as substitutes for the text. When the replacement determination unit 13 determines that a piece of text needs to be replaced, the select control unit 15 may refer to the correspondence and select a substitute from the preliminary text storing unit 14.

In the foregoing embodiments, the select control unit 15 compares the attribute value of each piece of attribute information on the text to be replaced and that of each piece of attribute information on each piece of text stored in the preliminary text storing unit 14. Then, a piece of text that maximizes the number of matches with the attribute values of the text to be replaced as well as maximizes the sum of the degrees of importance of pieces of attribute information that have the matching attribute values may be selected from the preliminary text storing unit 14 as the piece of text to replace the text to be replaced.

The select control unit 15 has been constructed to select the piece of text to replace the text to be replaced from the preliminary text storing unit 14 by using the degrees of importance associated with the attribute information. Nevertheless, instead of using the degrees of importance, the select control unit 15 may compare the attribute value of each piece of attribute information on the text to be replaced and that of each piece of attribute information on each piece of text stored in the preliminary text storing unit 14, and select a piece of text that maximizes the number of matching attribute values (the number of matches) or that provides the number of matching attribute values more than a predetermined threshold from the preliminary text storing unit 14 as the piece of text to replace the text to be replaced.

In the foregoing embodiments, the attribute information on the text stored in the text storing unit 11 may include presentation necessity information that indicates whether the text has been presented or not. The text presenting unit 12 may present text stored in the text storing unit 11 if the text is associated with presentation necessity information that indicates of no previous presentation. After the presentation, the text presenting unit 12 can update the attribute information on the text stored in the text storing unit 11 so that the presentation necessity information indicates of the previous presentation. In such a case, the text presentation apparatus 10 stores the text selected in step S4 of FIG. 5 into the text storing unit 11 in association with the attribute information including the presentation necessity information that indicates that the text has not been presented yet.

Figure 13:
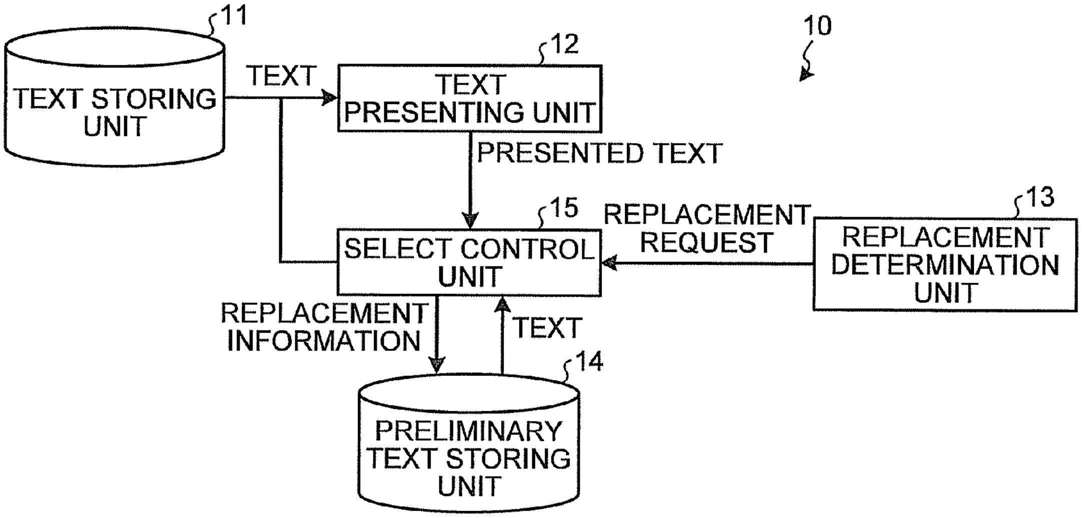
FIG. 13 is a diagram showing an example of the functional configuration of a text presentation apparatus according to a modification.

The text presentation apparatus 10 may retain replacement information that describes the correspondence between the text to be replaced and the text to replace the text to be replaced. FIG. 13 is a diagram showing the functional configuration of the text presentation apparatus 10 in such a case. As shown in the diagram, the select control unit 15 has an input and output configuration different from that shown in FIG. 1. The select control unit 15 selects a piece of text to replace the text that the replacement determination unit 13 determines needs to be replaced (text to be replaced) from the preliminary text storing unit 14 on the basis of the attribute information on the text to be replaced. The select control unit 15 stores replacement information into the preliminary text storing unit 14 in association with the selected text, the replacement information indicating of being a substitute for the text to be replaced. The select control unit 15 then makes the text presenting unit 12 present the selected text, without storing the selected text into the text storing unit 11.

The replacement information may describe the correspondence between the character string that constitutes the text to be replaced and the character string that constitutes the substitute. With text numbers assigned to respective pieces of text, the replacement information may describe the correspondence between the text number of the text to be replaced and that of the substitute.

Figure 14:
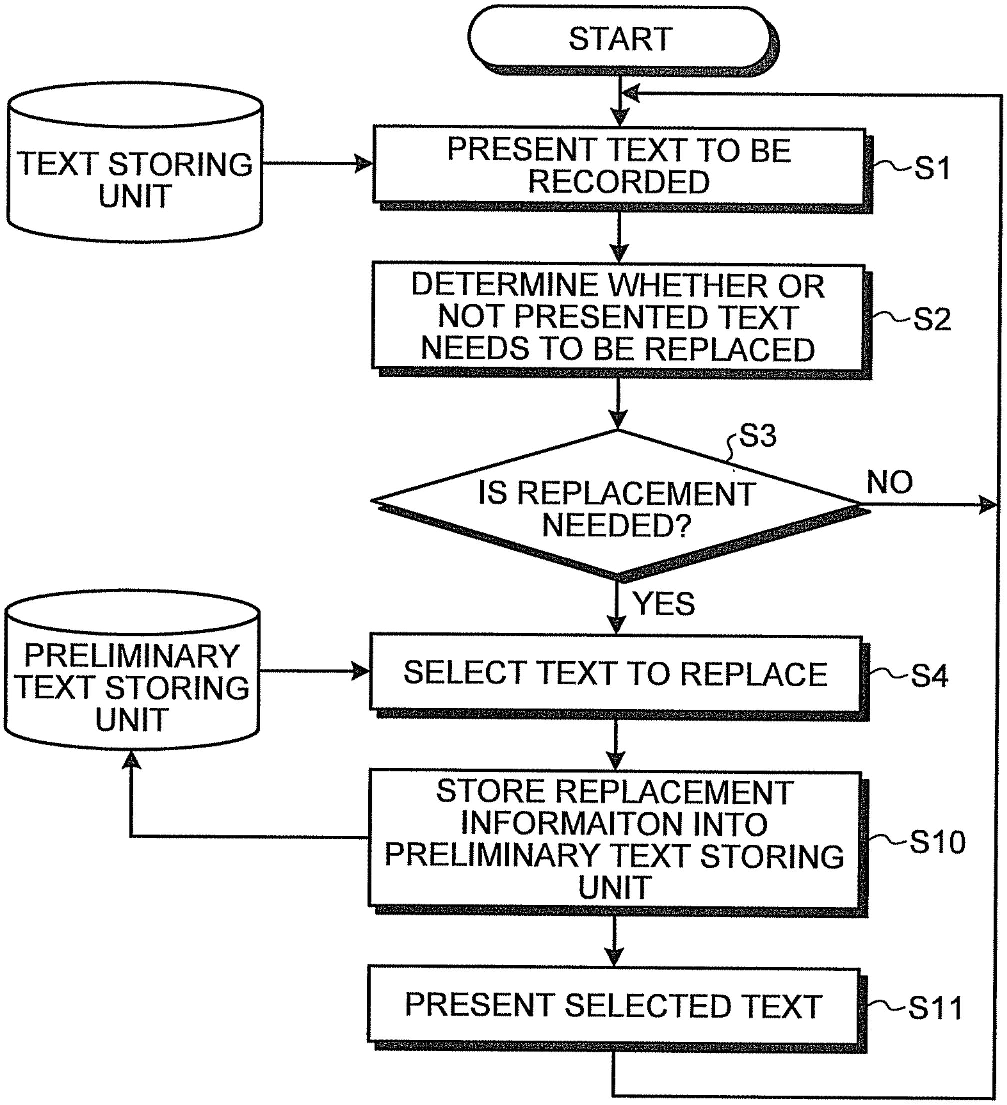
FIG. 14 is a flowchart showing the procedure of text presentation and replacement processing to be performed by the text presentation apparatus.

FIG. 14 is a flowchart showing the procedure of the text presentation and replacement processing to be performed by the text presentation apparatus 10 according to the present modification. Steps S1 to S4 are the same as in the foregoing first embodiment. In step S10, using the function of the select control unit 15, the text presentation apparatus 10 stores replacement information into the preliminary text storing unit 14 in association with the piece of text selected in step S4, the replacement information describing that the piece of text is to replace the text to be replaced which is determined needs to be replaced in step S3. In step S11, the text presentation apparatus 10 makes the text presenting unit 12 present the text selected in step S4.

According to such a configuration, storing the replacement information into the preliminary text storing unit 14 can facilitate checking the text to replace the text to be replaced. Since the text selected as a substitute for the text to be replaced is not stored into the text storing unit 11, it is possible to save the memory resources.

The text presentation apparatus 10 may further include a presented text storing unit, and store the text presented by the text presenting unit 12 into the presented text storing unit. If the text is determined needs to be replaced, a piece of text selected from the preliminary text storing unit 14 as a substitute for the text (text to be replaced) may be presented by the text presenting unit 12, and the substitute may be stored into the presented text storing unit. Here, the text presentation apparatus 10 may delete the text to be replaced from the presented text storing unit so that the text to be replaced is replaced with the substitute in the presented text storing unit.

Such a configuration can also facilitate checking the text to replace the text to be replaced.

In the foregoing embodiments, the text presentation apparatus 10 may exchange the text to be replaced and the text to replace the text to be replaced by storing the text to replace and its attribute information into the text storing unit 11, deleting the text to be replaced and its attribute information from the text storing unit 11, and storing the text to be replaced and its attribute information into the preliminary text storing unit 14. With such a configuration, the text presentation apparatus 10 may further retain the replacement information described above. Suppose that the text selected by the select control unit 15 as a substitute for the text to be replaced is presented by the text presenting unit 12, and the replacement determination unit 13 determines that the text selected as a substitute needs to be replaced. In such a case, the select control unit 15 refers to the replacement information that is stored in the preliminary text storing unit 14 in association with the substitute, and selects another piece of text to replace the text to be replaced in the same manner as described above. Here, the selection is made so as to exclude the piece of text, whose correspondence with the substitute that the replacement determination unit 13 determines needs to be replaced is indicated by the replacement information, from among the pieces of text stored in the preliminary text storing unit 14.

In the foregoing embodiments, the method by which the replacement determination unit 13 determines whether or not the text presented by the text presenting unit 12 needs to be replaced, on the basis of a speaker's input for the text, is not limited to the above-mentioned examples. For example, the replacement determination unit 13 may determine that the text presented by the text presenting unit 12 needs to be replaced if an operation input to give an instruction to retake the text is accepted through the operation input unit more than a predetermined times. The replacement determination unit 13 may also make such a determination if the voice that is input to the voice input unit for the text does not have sufficient quality. Whether or not the voice input for the text presented by the text presenting unit 12 has sufficient quality is determined by an analysis using various known technologies. For example, the determination is made depending on the presence or absence of speech errors or erroneous stresses which are detected by various types of known voice recognition technologies, or depending on whether or not the word recognition rate falls below a predetermined threshold. Aside from such voice recognition technologies, the determination may be made on the basis of the following: the presence or absence of noise in the voice; whether or not a basic frequency (F0), the tone pitch of the voice, continues to be detected in extremely high or low values; whether or not the sound level of the voice drops significantly during continuous recording; and whether or not the speech maintains constant speed. When it is determined by such an analysis of the voice input through the voice input unit that the text presented by the text presenting unit 12 needs to be replaced, the replacement determination unit 13 may inquire of the speaker whether or not a replacement is needed. Specifically, for example, the replacement determination unit 13 makes the display unit display a message saying that the text needs to be replaced, prompting for an operation input to accept or reject the replacement of the text.

The foregoing embodiments have dealt with the cases where the text presenting unit 12 presents the text, for example, by displaying it on the display unit. However, the present invention is not limited thereto. For example, the text presentation apparatus 10 may include a printing unit for printing the text as an image onto a print sheet. The text presenting unit 12 may present the text by making the printing unit print the text as an image onto a print sheet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A text presentation apparatus presenting text for a speaker to read aloud for voice recording, the apparatus comprising:

a text storing unit configured to store first text;

a presenting unit configured to present the first text;

a determination unit configured to determine whether or not the first text needs to be replaced, on the basis of a speaker's input for the first text presented;

a preliminary text storing unit configured to store preliminary text;

a select unit configured to select, if it is determined that the first text needs to be replaced, second text to replace the first text from among the preliminary text, the selecting being performed on the basis of attribute information describing an attribute of the first text and on the basis of at least one of attribute information describing pronunciation of the first text and attribute information describing a stress type of the first text; and a control unit configured to control the presenting unit so that the presenting unit presents the second text, wherein:

the pieces of attribute information are associated with respective degrees of importance; and the select unit, if it is determined that the first text needs to be replaced, calculates, for each piece of the preliminary text that is associated with the attribute information having an attribute value matching that of at least one of the pieces of attribute information on the first text, the sum of the degrees of importance that are associated with pieces of attribute information having matching attribute values, and selects the second text that maximizes the sum of the degrees of importance.

2. The apparatus according to claim 1, further comprising an input accepting unit configured to accept an operation input from the speaker, wherein the determination unit determines that the first text needs to be replaced in at least one of cases when a speaker's operation input to give an instruction to replace the first text is accepted by the input accepting unit and when an operation input to give an instruction to retake the first text is accepted by the input accepting unit a given number of times or more.

3. The apparatus according to claim 1, further comprising a voice input unit into which speaker's voice is input, wherein the determination unit determines that the first text needs to be replaced when a speaker's voice to give an instruction to replace the first text is input into the voice input unit.

4. The apparatus according to claim 1,
further comprising a voice input unit into which speaker's voice is input, wherein
the determination unit determines whether the first text needs to be replaced or not depending on quality of the voice input into the voice input unit.

5. The apparatus according to claim 1, wherein:
the text storing unit stores the first text in association with the attribute information;
the preliminary text storing unit stores the preliminary text in association with the attribute information; and
the select unit, if it is determined that the first text needs to be replaced, selects the second text with reference text, the selecting being performed on the basis of the attribute information that is stored in the text storing unit in association with the first text.

6. The apparatus according to claim 1, wherein
the select unit, if it is determined that the first text needs to be replaced,
compares an attribute value of at least one of the pieces of attribute information on the first text with an attribute value of at least one of the pieces of attribute information on the preliminary text, and
selects the second text that maximizes the number of matching attribute values or that provides the number of matching attribute values more than a predetermined threshold.

7. The apparatus according to claim 1, wherein
the select unit, if it is determined that the first text needs to be replaced, selects predetermined second text from the preliminary text on the basis of the attribute information on the first text.

8. A text presentation method to be performed by a text presentation apparatus presenting text for a speaker to read aloud for voice recording,
the method comprising:
presenting, by a system comprising a processor, first text on a presenting unit;
determining, by the system, whether or not the first text needs to be replaced, on the basis of a speaker's input for the first text presented;
selecting, by the system, if it is determined that the first text needs to be replaced, second text to replace the first text from among preliminary text, the selecting being performed on the basis of at least one of attribute information describing pronunciation of the first text and attribute information describing a stress type of the first text; and
controlling, by the system, the presenting unit so that the presenting unit presents the second text, wherein:
the pieces of attribute information are associated with respective degrees of importance; and
the selecting includes, if it is determined that the first text needs to be replaced,
calculating, for each piece of the preliminary text that is associated with the attribute information having an attribute value matching that of at least one of the pieces of attribute information on the first text, the sum of the degrees of importance that are associated with pieces of attribute information having matching attribute values, and
selecting the second text that maximizes the sum of the degrees of importance.

9. A non-transitory computer program product comprising a computer-readable medium including programmed instructions for presenting text for a speaker to read aloud for voice recording, wherein the instructions, when executed by a computer, cause the computer to perform:
presenting first text on a presenting unit;
determining whether or not the first text needs to be replaced, on the basis of a speaker's input for the first text presented;
selecting, if it is determined that the first text needs to be replaced, second text to replace the first text from among preliminary text, the selecting being performed on the basis of at least one of attribute information describing pronunciation of the first text and attribute information describing a stress type of the first text; and
controlling the presenting unit so that the presenting unit presents the second text, wherein:
the pieces of attribute information are associated with respective degrees of importance; and
the selecting includes, if it is determined that the first text needs to be replaced,
calculating, for each piece of the preliminary text that is associated with the attribute information having an attribute value matching that of at least one of the pieces of attribute information on the first text, the sum of the degrees of importance that are associated with pieces of attribute information having matching attribute values, and
selecting the second text that maximizes the sum of the degrees of importance.

10. The apparatus according to claim 1, wherein:
the attribute information is necessary to create a synthesis dictionary, the synthesis dictionary being used to create a synthesized speech, and
the attribute information includes, as the attribute value, pronunciation, stress type of a stress key phrase, type of a low-frequency phoneme included in a text, and number of stressed phrases that constitute a text.

11. The apparatus according to claim 10, wherein the degree of importance is set in association with each attribute value.

* * * * *